(12) United States Patent
Gold

(10) Patent No.: US 6,987,807 B2
(45) Date of Patent: Jan. 17, 2006

(54) FRAME COMPRESSION USING DIFFERENTIAL CODES AND AN ESCAPE CODE

(75) Inventor: Kevin C. Gold, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 619 days.

(21) Appl. No.: 10/126,296

(22) Filed: Apr. 19, 2002

(65) Prior Publication Data

US 2003/0198292 A1 Oct. 23, 2003

(51) Int. Cl.
*H04N 7/12* (2006.01)

(52) U.S. Cl. ............ 375/240.01; 375/240; 375/240.12; 375/240.15; 375/240.24

(58) Field of Classification Search ............ 375/240.01, 375/240, 240.12, 240.15, 240.24
See application file for complete search history.

(56) References Cited

U.S. PATENT DOCUMENTS 5,473,378 A * 12/1995 Tamitani ............... 375/240.15
5,973,744 A * 10/1999 Kim ...................... 375/240.24

* cited by examiner

*Primary Examiner*—Allen Wong (57) ABSTRACT

Digital video data streams that conform to standards such as the ITU-T H.263 and MPEG-4 ISO/IEC standards are compressed to reduce the amount of memory needed to store these streams. Information for groups of pixels are compressed into segments of encoded information. Each segment of encoded information includes luminance values that are rounded and truncated, the full-length values of chrominance information for the first pixel in the group, and codes that represent differences in chrominance values between adjacent pixels in the remainder of the group. A special "escape" code is used to represent the chrominance value for a pixel whenever the difference in chrominance values between that pixel and the preceding pixel exceeds a threshold.

36 Claims, 5 Drawing Sheets

FRAME COMPRESSION USING DIFFERENTIAL CODES AND AN ESCAPE CODE

CROSS-REFERENCE TO RELATED APPLICATIONS

This application is related to US patent application entitled "Frame Compression Using Radix Approximation" by Kevin C. Gold, filed concurrently herewith and assigned to the assignee of this application.

TECHNICAL FIELD

The present invention is related generally to video signal processing, and is related more specifically to reducing the amount of memory needed to process encoded digital video data streams that conform to ITU-T H.263 and MPEG-4 ISO/IEC standards.

BACKGROUND ART

Memory is expensive, and most of the memory that is required to process encoded digital video data streams is used to store luminance and chrominance values for each pixel in a frame of data. Information for a frame must be stored in memory while that frame is decoded and processed. Although reducing memory requirements is attractive for any application, it is especially important for applications in hand-held and low-power devices like mobile telephones and so called personal digital assistants (PDAs) because limited circuit board space and power severely restrict memory chip size and power requirements.

Many applications conform to one of two coding standards that reduce memory requirements by using data compression techniques. The H.263 standard, published by the International Telecommunications Union (ITU), supports video compression for video-conferencing and video-telephony applications. The MPEG-4 standard, known officially as ISO/IEC 14496, is published by the International Organization for Standardization (ISO) and facilitates the integration of digital television, interactive graphics and interactive multimedia. These techniques can reduce the memory required by processes that transmit or store the information, but they do not address the amount of memory required by processes that decode the encoded information.

Attempts to provide additional compression encounter several problems. One problem is caused by many compression schemes that introduce small errors into the digital video data and the magnitude of these errors accumulates during decoding. Small inaccuracies caused by rounding or truncation, for example, are amplified in predictive filters used by the decoding process because the errors in each stage cause larger errors in a later stage of prediction.

Another problem is caused by the fact individual pixels throughout an image must be accessed quickly for processes like motion compensation. This requirement makes compression techniques that rely on variable-length symbols unattractive because random accesses into memory are more difficult.

DISCLOSURE OF INVENTION

It is an object of the present invention to provide a technique for reducing the amount of memory required to store and process frames of encoded digital video data.

According to one aspect of the present invention, compression of digital video data representing luminance values, first chrominance values and second chrominance values for a sequence of pixels arranged in a group having a first pixel followed by one or more other pixels is carried out by storing in memory a compressed representation of the luminance values; storing in memory a representation of the first chrominance value of the first pixel in the group of pixels; storing in memory a representation of the second chrominance value of the first pixel in the group of pixels; determining a first difference between the first chrominance value of a second pixel in the group and the first chrominance value of another pixel in the group that immediately precedes the second pixel; storing in memory a representation of the first difference when the first difference does not exceed a first threshold, and storing in memory a first code in memory when the first difference exceeds the first threshold, wherein the first code is represented by a value that is distinct from values stored to represent the first difference; determining a second difference between the second chrominance value of the second pixel and the second chrominance value of the other pixel that immediately precedes the second pixel; and storing in memory a representation of the second difference when the second difference does not exceed a second threshold, and storing in memory a second code in memory when the second difference exceeds the second threshold, wherein the second code is represented by a value that is distinct from values stored to represent the second difference.

According to another aspect of the present invention, decompression of digital video data representing luminance values, first chrominance values and second chrominance values for a sequence of pixels arranged in segments of pixels each having a first pixel followed by one or more other pixels is carried out by retrieving from memory and expanding the luminance values; retrieving from memory the first chrominance value of the first pixel in the first segment of pixels; retrieving from memory the second chrominance value of the first pixel in the first segment of pixels; retrieving from memory a first value that corresponds to the first chrominance value of a second pixel in the first segment of pixels, wherein the first value either represents a first difference between the first chrominance value of the second pixel and the first chrominance value of another pixel in the first segment that immediately precedes the second pixel or is a first code that is distinct from values representing the first difference; establishing the first chrominance value of the second pixel from the first chrominance value of the first pixel in the second segment of pixels when the first value is the first code and, when the first value is not the first code, establishing the first chrominance value of the second pixel by combining the first difference with the first chrominance value of the other pixel; retrieving from memory a second value that corresponds to the second chrominance value of the second pixel in the first segment of pixels, wherein the second value either represents a second difference between the second chrominance value of the second pixel and the second chrominance value of the other pixel in the first segment or is a second code that is distinct from values representing the second difference; and establishing the second chrominance value of the second pixel from the second chrominance value of the first pixel in the second segment of pixels when the second value is the second code and, when the second value is not the second code, establishing the second chrominance value of the second pixel by combining the second difference with the second chrominance value of the other pixel.

The various features of the present invention and its preferred implementations may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview

Figure 1:
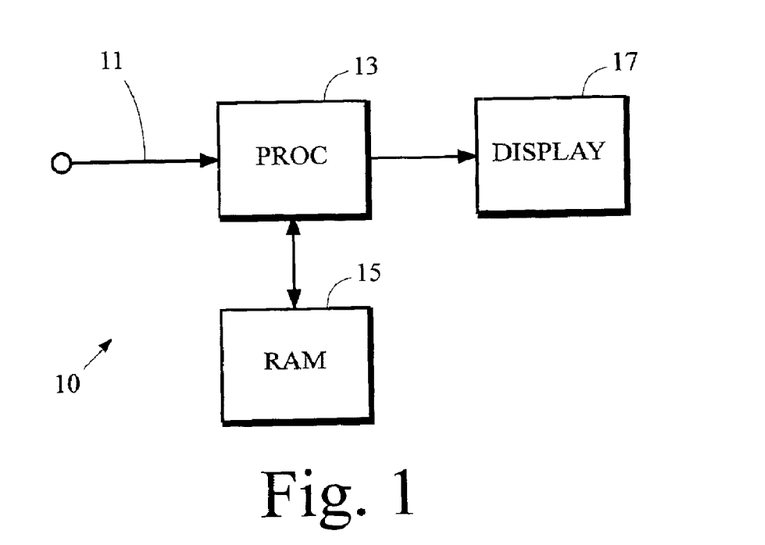
FIGS. 1 to 2 are schematic block diagrams of devices that receive and process digital video data streams.

FIG. 1 is a schematic block diagram of a device 10 such as a mobile telephone or a personal digital assistant (PDA) that receives and processes a digital video data stream and incorporates various aspects of the present invention. The digital video data stream is received from a path 11, which may be a wired or wireless communication paths with another device that provides the data stream. The processor 13 processes the data stream arranged in frames of information, stores the frames of information into random access memory (RAM) 15, and subsequently retrieves the stored information from the RAM 15, processes the frames of information to prepare them for use in an application, and passes the processed information to the application. In the example shown, the application is the display component 17, which may be implemented by a liquid crystal display (LCD) or thin-film transistor (TFT) panel, for example. Other examples of applications include video recorders, video editors, and video broadcast transmitters.

The present invention is directed toward data compression of the digital video information stored in the RAM 15 so that the amount of RAM required to store the information can be reduced. In the implementation shown in FIG. 1, the present invention is implemented by functions performed by the processor 13. In another implementation shown in FIG. 2, the present invention is implemented by a data compressor/expander 14 interposed between the processor 13 and the RAM 15. This implementation can incorporate aspects of the present invention with existing processing devices without requiring any changes to the functions performed by the processor 13. This implementation is capable of letting the processor 13 operate as if it stored and retrieved digital video information directly with the RAM 15. The data compressor/expander 14 intercepts memory access requests by the processor 13 to store and retrieve digital video information in the RAM 15, and it services those requests using an amount of RAM that is smaller than otherwise would be possible.

Figure 2:
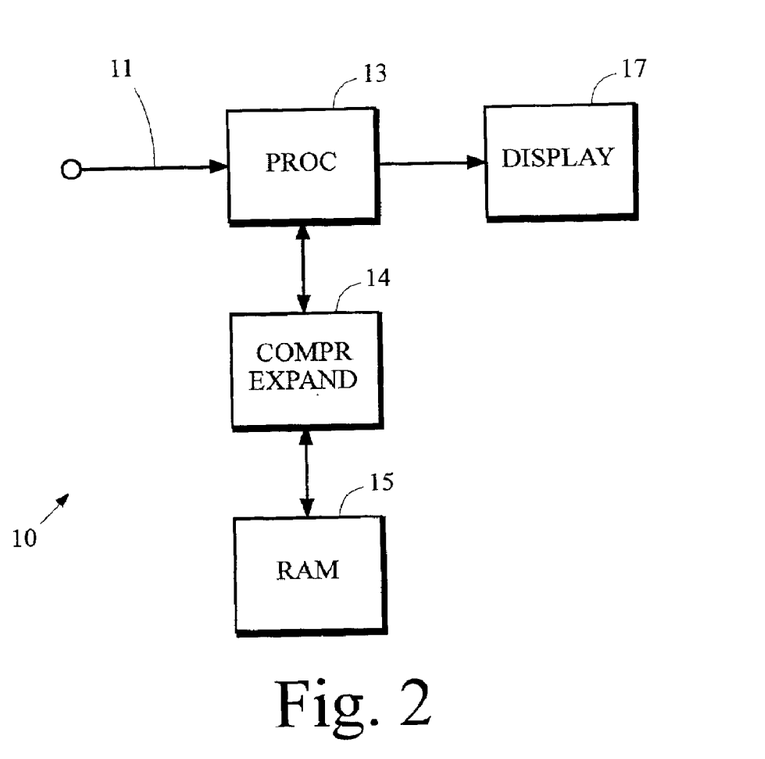

The schematic block diagrams shown in these figures omit components that may be important to practical implementations but are not required to explain the present invention. For example, the diagrams omit features that pertain to power, power management, and input/output interfaces.

Components in the device 10, as well as in any other device that incorporates aspects of the present invention, may be implemented in any suitable manner including discrete and integrated electronic components, programmed logic, gate arrays, general purpose program-controlled processors, digital signal processors, and application-specific integrated circuits. For implementations that use program-controlled processors, the controlling program of instructions may be conveyed by essentially any device-readable media including magnetic and optical storage media, and solid-state memory devices. The manner of implementation is not critical in principle to the present invention.

The following discussion refers to implementations of the present invention that may be used to compress information representing picture elements ("pixels") in digital video data streams that conform to ITU-T H.263 and MPEG-4 ISO/IEC standards, and to recover decompressed video information from the compressed representations. It should be understood, however, that the present invention may be applied to data streams that conform to other standards. The methods discussed below may be performed by the processor 13 in implementations of the device 10 like that shown in FIG. 1, performed by the data compression/expansion processor 14 in implementations like that shown in FIG. 2, or performed by essentially any other arrangement of processing circuitry that may be desired.

Data Compression

Figure 3:
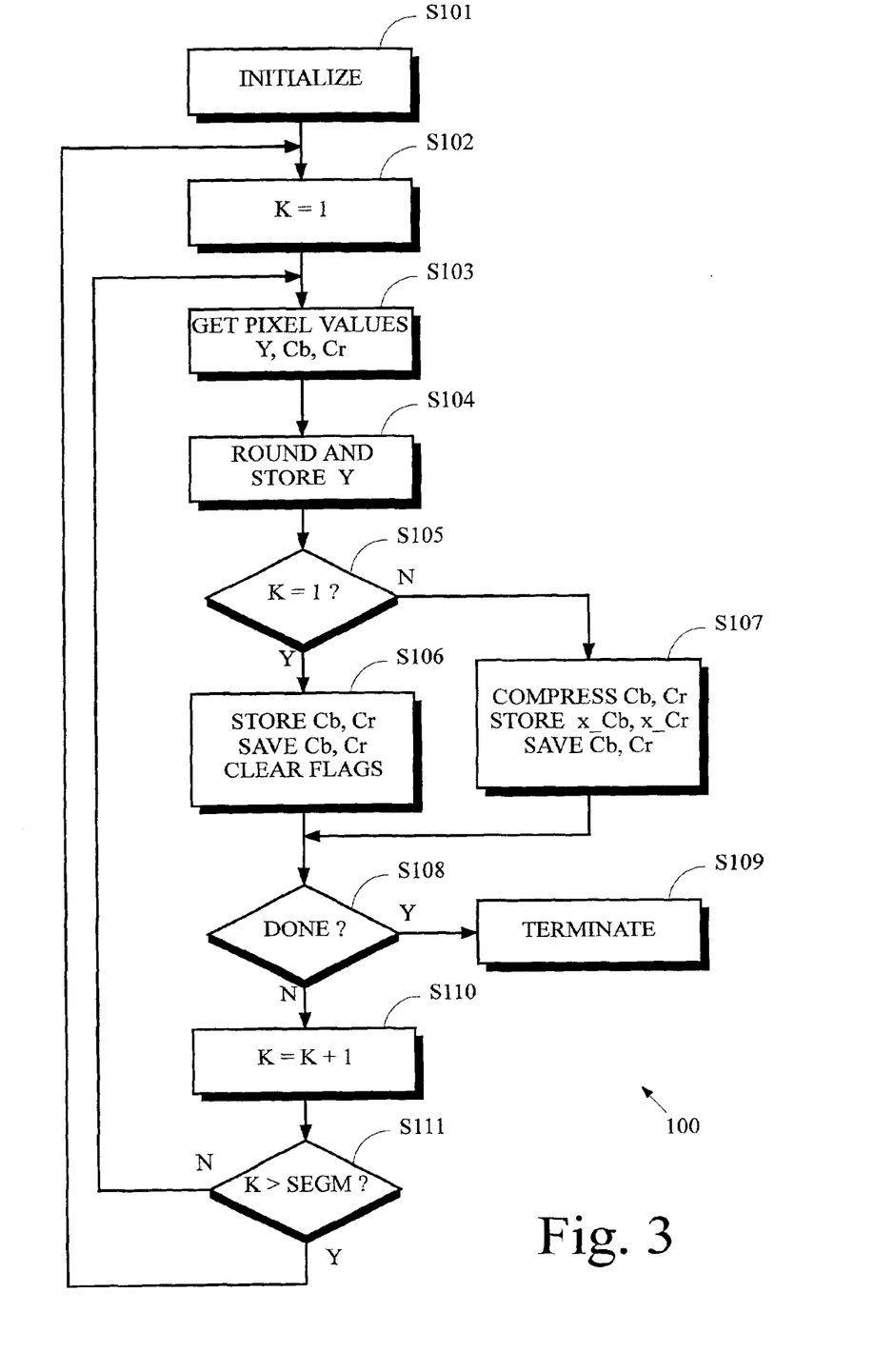
FIGS. 3 to 4 are flow diagrams illustrating steps in methods that may be used to perform data compression of digital video information.

FIG. 3 illustrates steps in a method 100 that compresses information for groups of pixels in a frame of digital video information into respective segments of compressed information. Step S101 initializes program and hardware components. A variable K, which is used to count the pixels that are compressed into a particular segment, is set to an initial value equal to one in step S102. Step S103 extracts information from a digital video data stream to obtain the luminance value Y and the chrominance values Cb, Cr for a pixel.

The luminance value Y is rounded and truncated in step S104, and the truncated value is stored in the RAM 15. Preferably, the rounding and truncation operations should not have any bias, otherwise the luminance that is obtained by a complementary data-expansion process using predictive methods will quickly fade to white or to black, depending on the direction of the bias. Luminance values that are equidistant from either of two valid truncated values should be rounded to the even truncated value. If predictive methods are not used in the expansion process, the bias introduced by mere truncation is not as significant.

Step S105 determines whether the variable K is equal to one. If K is equal to one, information for the first pixel in a respective segment is being compressed and processing continues with step S106. In step S106, full-length or uncompressed values for the chrominance information Cb, Cr are stored in the RAM 15. The Cb, Cr values are saved in variables Cb_Save, Cr_Save, respectively, and flags Cb_Flag and Cr_Flag are cleared for use in step S107. If K is not equal to one, processing continues with step S107, which compresses the chrominance values Cb, Cr into codes x_Cb, x_Cr and stores the codes into RAM in a manner that is described below.

Step S108 determines whether all digital video information for the current frame has been compressed and stored. If it has, the method 100 terminates in step S109. If more digital video data remains to be compressed, processing continues with step S110, which increments the variable K to count the number of pixels processed thus far in the current segment. Step S111 determines whether the count K is greater than the number Segm of pixels to be compressed into each segment. If the count K is not greater than Segm, the method 100 proceeds to compress information for the next pixel into the current segment by continuing with step S103. If K is not greater than Segm, then the method 100 begins to compress information into a new segment by continuing with step S102.

Differential Encoding

The inventor has determined that differences in chrominance values between adjacent pixels is generally very small except at boundaries of objects in an image. The present invention exploits this characteristic by arranging pixels into groups, storing chrominance values for the first pixel in each group, and encoding the differences in chrominance values between the remaining pixels in each group. If a large difference in a chrominance value occurs, it is assumed the boundary of an object has been encountered and the chrominance value for the pixel at the boundary is approximated by the chrominance value of the first pixel in the next group. This situation is represented by a special "escape" code having a value that differs from all valid differential codes. This technique attempts to approximate the chrominance value of the pixel at the boundary with the chrominance value of another pixel in the interior of the object. The chrominance value for the remaining pixels in the group are approximated in the same manner by representing each of them with the "escape" code.

In one particular implementation that compresses digital video information for pictures having 176-by-144 pixels (QCIF format) or pictures having 352-by-288 pixels (CIF format), the luminance value Y and the chrominance values Cb, Cr in the input digital video data stream are all eight bits in length. The luminance value Y is rounded and truncated to a length of six bits. Differential chrominance values are encoded into three-bit codes as discussed below. One particular three-bit pattern is reserved for the "escape" code. Segm is set equal to eight.

Figure 4:
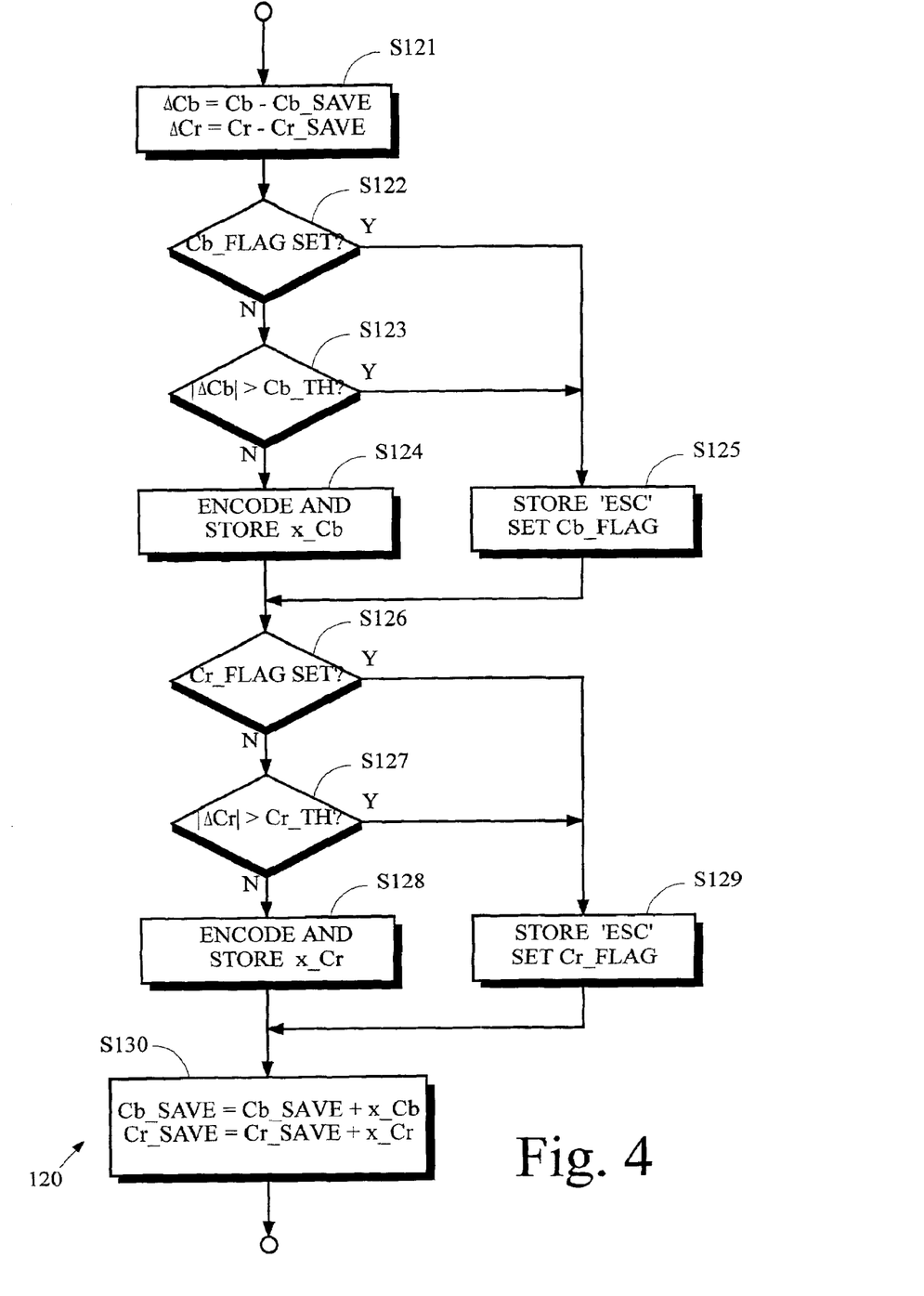

A method 120 that may be used to perform step S107 for these types of digital video data streams is illustrated in FIG. 4. In this method, step S121 calculates differential values ΔCb, ΔCr for the chrominance values Cb, Cr, respectively, according to the following expressions:

ΔCb=Cb−Cb_Save

ΔCr=Cr−Cr_Save where Cb=a first chrominance value for a particular pixel;
 Cr=a second chrominance value for the particular pixel;
 Cb_Save=the first chrominance value of a previous pixel; and
 Cr_Save=the second chrominance value of the previous pixel.

The saved values Cb_Save, Cr_Save are initialized in step S106 of the method 100 by setting these two variables equal to the respective chrominance values Cb, Cr of the first pixel in the segment. These "save" values are updated for each pixel in step S130.

Step S122 determines whether a Cb_Flag is set. This flag is initially cleared in step S106 for each segment. If the flag is set, the method 120 continues with step S125. If the flag is not set, step S123 determines whether the absolute value of differential value ΔCb exceeds a threshold Cb_Th. If not, step S124 encodes the differential value ΔCb into a code x_Cb and stores the code in the RAM 15. If the absolute value of the differential value does exceed the threshold, the method continues with step S125, which stores an "escape" code in the RAM 15 and sets the flag Cb_Flag.

The flag Cb_Flag indicates whether an "escape" code has been stored in the RAM 15 for the Cb chrorninance value of any pixel in the current segment. If the flag is set, indicating an "escape" code has been stored, an "escape" code is stored for all remaining Cb chrominance values in that segment.

A similar process is used to compress the Cr chrominance value. Step S126 determines whether a Cr_Flag is set. This flag is initially cleared in step S106 for each segment. If the flag is set, the method 120 continues with step S129. If the flag is not set, step S127 determines whether the absolute value of differential value ΔCr exceeds a threshold Cr_Th. If not, step S128 encodes the differential value ΔCr into a code x_Cr and stores the code in the RAM 15. If the absolute value of the differential does exceed the threshold, the method continues with step S129, which stores an "escape" code in the RAM 15 and sets the flag Cr_Flag. The Cr_Flag is used in an analogous manner to that described above for the Cb_Flag.

Step S130 updates the program variables Cb_Save, Cr_Save to represent the chrominance values Cb, Cr just compressed and stored into the RAM 15.

In the particular implementation mentioned above that compresses digital video information for pictures in either the QCIF or CIF formats, the differential values ΔCr, ΔCb and the "escape" code are encoded and stored into the RAM 15 as three-bit two's complement binary numbers. The two threshold values Cb_Th, Cr_Th are each equal to twenty. One arrangement for the three-bit code x is as follows:

$$x = \begin{cases} 011 & \text{for } \Delta C > 3 \\ \Delta C & \text{for } -3 \le \Delta C \le 3 \\ 111 & \text{for } -3 < \Delta C \\ 1000 & \text{"escape" for } |\Delta C| > Th \end{cases}$$

where ΔC=the three-bit two's complement differential value for chrominance; and
 Th=the chrominance threshold value.

Data Expansion

Figure 5:
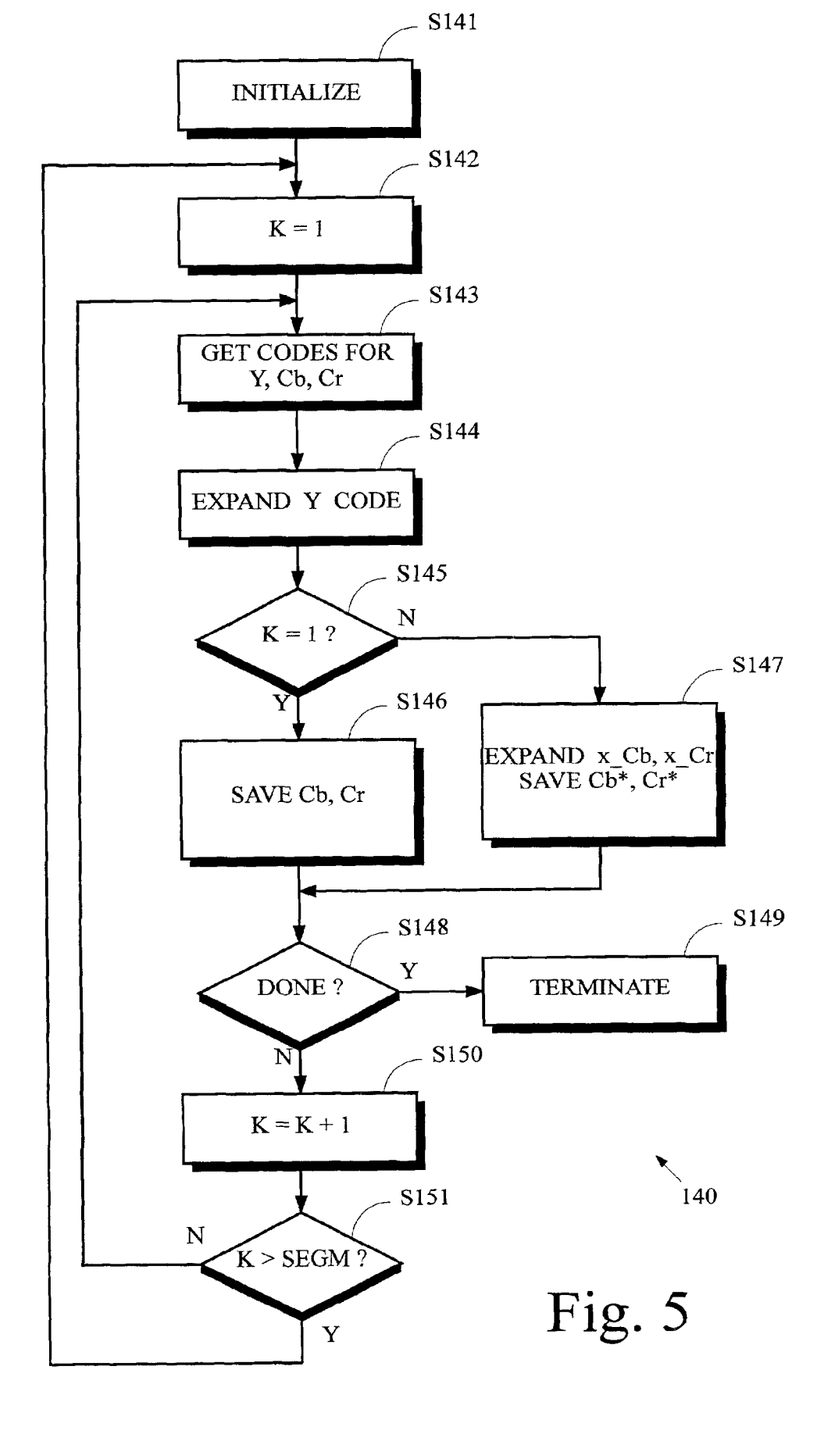
FIGS. 5 to 6 are flow diagrams illustrating steps in methods that may be used to recover digital video information from compressed representations.

FIG. 5 illustrates steps in a method 140 that decompresses encoded information for segments of pixels in a frame of digital video information. Step S141 initializes program and hardware components. A variable K, which is used to count the pixels that are decompressed from a particular segment, is set to an initial value equal to one in step S142. Step S143 retrieves information from the RAM 15 to obtain codes for the luminance value Y and the chrominance values Cb, Cr for a pixel.

Step S144 pads the luminance value Y with zero bits to expand it to its appropriate length.

Step S145 determines whether the counter variable K is equal to one. If K is equal to one, information for the first pixel in a respective segment is being decompressed and processing continues with step S146. Step S146 saves the Cb, Cr values in variables Cb_Save, Cr_Save, respectively. No additional processing is needed to obtain the uncompressed values for the chrominance information Cb, Cr because these values were retrieved directly from the RAM 15 in step S143. If K is not equal to one, processing continues with step S147, which decompresses the encoded chrominance values x_Cb, x_Cr in a manner that is described below.

Step S148 determines whether all digital video information for the current frame has been decompressed. If it has, the method 140 terminates in step S149. If more digital video data remains to be decompressed, processing continues with step S150, which increments the variable K to count the number of pixels processed thus far in the current segment. Step S151 determines whether the count K is greater than the number Segm of pixels to be decompressed from each segment. If the count K is not greater than Segm, the method 140 proceeds to decompress information for the next pixel in the current segment by continuing with step S143. If K is greater than Segm, then the method 140 begins to decompress information for a new segment by continuing with step S142.

In one particular implementation of the method 140 that is complementary to the particular implementation of the method 100 mentioned above, six-bit codes for the luminance values Y are retrieved from memory and padded into eight-bit values, and the chrominance values Cb, Cr are decompressed from three-bit codes as explained below. Segm is set equal to eight.

Differential Decoding

Figure 6:
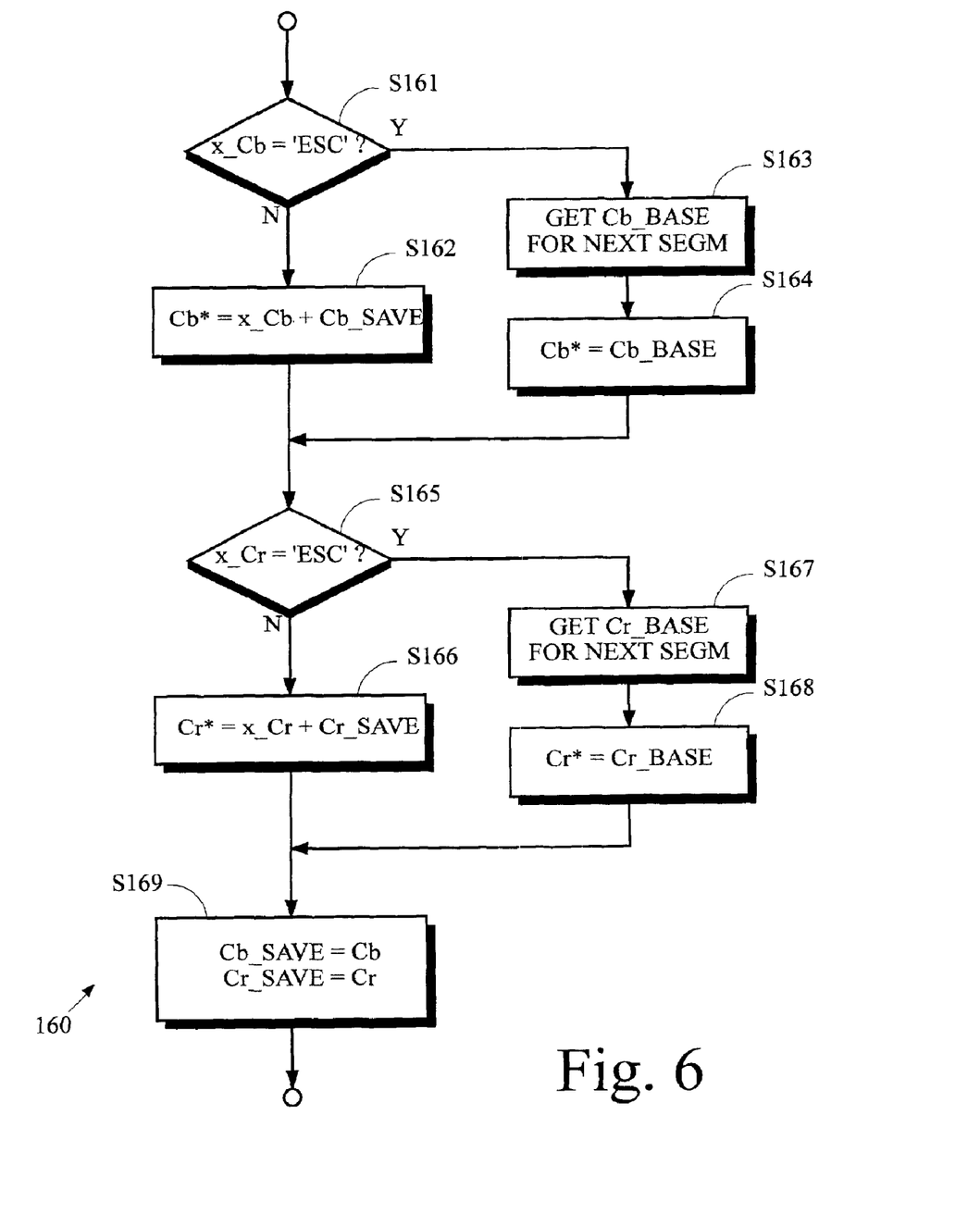

A method 160 that may be used to perform step S147 is illustrated in FIG. 6. In this method, step S161 determines whether the code x_Cb, which represents the Cb chrominance value in the RAM 15, is equal to a special "escape" code. If not, the method continues with step S162. If the coded value is equal to the "escape" code, processing continues with step S163.

Step S162 decompresses the Cb chrominance value by adding the encoded value x_Cb to a saved value for Cb, as follows:

Cb*=x_Cb+Cb_Save where Cb*=the decompressed first chrominance value for a particular pixel;

x_Cb=the compressed representation of Cb; and

Cb_Save=the first chrominance value of a previous pixel.

The saved value Cb_Save is initialized in step S166 of the method 140 by setting this variable equal to the chrominance value Cb of the first pixel in the segment. This "save" value is updated in step S169 for each pixel in the segment.

Processing continues with step S163 if the encoded value x_Cb is equal to the "escape" code. Step S163 obtains from the RAM 15 the Cb chrominance value for the first pixel in the next segment. This value is referred to as the Cb_Base value. For implementations in which fixed-length codes are used to represent the luminance and chrominance values for each pixel in a segment, and in which these values are stored in adjacent locations of the RAM 15, the location of the base value in RAM for the next segment relative to the location of the "escape" code for the current pixel can be calculated using the fact that encoded information for (Segm−K) number of pixels is stored in memory between the current pixel and the start of the next segment. Step S164 decompresses the Cb chrominance information for the current pixel by setting the decompressed value Cb* equal to the base value Cb_Base for the next segment.

A similar process is used to decompress the Cr chrominance value. Step S165 determines whether the code x_Cr, which represents the Cr chrominance value in the RAM 15, is equal to the special "escape" code. If not, the method continues with step S166. If the coded value is equal to the "escape" code, processing continues with step S167.

Step S166 decompresses the Cr chrominance value by adding the encoded value x_Cr to a saved value for Cr, as follows:

C*r=x_Cr+Cr_Save where Cr*=the decompressed second chrominance value for a particular pixel;

x_Cr=the compressed representation of Cr; and

Cr_Save=the second chrominance value of a previous pixel.

The saved value Cr_Save is initialized in step S166 of the method 140 by setting this variable equal to the chrominance value Cr of the first pixel in the segment. This "save" value is updated in step S169 for each pixel in the segment.

Processing continues with step S167 if the encoded value x_Cr is equal to the "escape" code. Step S167 obtains from the RAM 15 the Cr chrominance value for the first pixel in the next segment, which is referred to as the Cr_Base value. Step S168 decompresses the Cr chrominance information for the current pixel by setting the decompressed value Cr* equal to the base value Cr_Base for the next segment.

Step S169 updates the program variables Cb_Save, Cr_Save to represent the chrominance values Cb, Cr for the pixel just decompressed from the RAM 15.

What is claimed is:

1. A method for compressing digital video data representing luminance values, first chrominance values and second chrominance values for a sequence of pixels arranged in a group having a first pixel followed by one or more other pixels, wherein the method comprises:

storing in memory a compressed representation of the luminance values;

storing in memory a representation of the first chrominance value of the first pixel in the group of pixels;

storing in memory a representation of the second chrominance value of the first pixel in the group of pixels;

determining a first difference between the first chrominance value of a second pixel in the group and the first chrominance value of another pixel in the group that immediately precedes the second pixel;

storing in memory a representation of the first difference when the first difference does not exceed a first threshold, and storing in memory a first code when the first difference exceeds the first threshold, wherein the first code is represented by a value that is distinct from values stored to represent the first difference;

determining a second difference between the second chrominance value of the second pixel and the second chrominance value of the other pixel that immediately precedes the second pixel; and storing in memory a representation of the second difference when the second difference does not exceed a second threshold, and storing in memory a second code when the second difference exceeds the second threshold, wherein the second code is represented by a value that is distinct from values stored to represent the second difference.

2. The method according to claim 1 that obtains the compressed representation of luminance values by rounding and truncating the luminance values, wherein luminance values equidistant from an even truncated value and an odd truncated value are rounded and truncated to the even truncated value.

3. The method according to claim 1 wherein the first code and the second code are identical.

4. The method according to claim 3 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

5. The method according to claim 1 wherein the representations of the first difference, the second difference, the first code and the second code are three-bit values, and the first and second thresholds are equal to twenty.

6. A method for decompressing digital video data representing luminance values, first chrominance values and second chrominance values for a sequence of pixels arranged in segments of pixels, wherein each segment has a first pixel followed by one or more other pixels, and wherein a first segment of pixels immediately precedes a second segment of pixels in the sequence, wherein the method comprises:

retrieving from memory and expanding the luminance values;

retrieving from memory the first chrominance value of the first pixel in the first segment of pixels;

retrieving from memory the second chrominance value of the first pixel in the first segment of pixels;

retrieving from memory a first value that corresponds to the first chrominance value of a second pixel in the first segment of pixels, wherein the first value either represents a first difference between the first chrominance value of the second pixel and the first chrominance value of another pixel in the first segment that immediately precedes the second pixel or is a first code that is distinct from values representing the first difference;

establishing the first chrominance value of the second pixel from the first chrominance value of the first pixel in the second segment of pixels when the first value is the first code and, when the first value is not the first code, establishing the first chrominance value of the second pixel by combining the first difference with the first chrominance value of the other pixel;

retrieving from memory a second value that corresponds to the second chrominance value of the second pixel in the first segment of pixels, wherein the second value either represents a second difference between the second chrominance value of the second pixel and the second chrominance value of the other pixel in the first segment or is a second code that is distinct from values representing the second difference; and establishing the second chrominance value of the second pixel from the second chrominance value of the first pixel in the second segment of pixels when the second value is the second code and, when the second value is not the second code, establishing the second chrominance value of the second pixel by combining the second difference with the second chrominance value of the other pixel.

7. The method according to claim 6 that expands the luminance values by padding the luminance values with bits having binary values of zero.

8. The method according to claim 6 wherein the first code and the second code are identical.

9. The method according to claim 8 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

10. A medium readable by a device and conveying a program of instructions executable by the device to perform a method for compressing digital video data representing luminance values, first chrominance values and second chrominance values for a sequence of pixels arranged in a group having a first pixel followed by one or more other pixels, wherein the method comprises:

storing in memory a compressed representation of the luminance values;

storing in memory a representation of the first chrominance value of the first pixel in the group of pixels;

storing in memory a representation of the second chrominance value of the first pixel in the group of pixels;

determining a first difference between the first chrominance value of a second pixel in the group and the first chrominance value of another pixel in the group that immediately precedes the second pixel;

storing in memory a representation of the first difference when the first difference does not exceed a first threshold, and storing in memory a first code when the first difference exceeds the first threshold, wherein the first code is represented by a value that is distinct from values stored to represent the first difference;

determining a second difference between the second chrominance value of the second pixel and the second chrominance value of the other pixel that immediately precedes the second pixel; and storing in memory a representation of the second difference when the second difference does not exceed a second threshold, and storing in memory a second code when the second difference exceeds the second threshold, wherein the second code is represented by a value that is distinct from values stored to represent the second difference.

11. The medium according to claim 10 that obtains the compressed representation of luminance values by rounding and truncating the luminance values, wherein luminance values equidistant from an even truncated value and an odd truncated value are rounded and truncated to the even truncated value.

12. The medium according to claim 10 wherein the first code and the second code are identical.

13. The medium according to claim 12 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

14. The medium according to claim 10 wherein the representations of the first difference, the second difference, the first code and the second code are three-bit values, and the first and second thresholds are equal to twenty.

15. A medium readable by a device and conveying a program of instructions executable by the device to perform a method for decompressing digital video data representing luminance values, first chrominance values and second chrominance values for a sequence of pixels arranged in segments of pixels, wherein each segment has a first pixel followed by one or more other pixels, and wherein a first segment of pixels immediately precedes a second segment of pixels in the sequence, wherein the method comprises:

retrieving from memory and expanding the luminance values;

retrieving from memory the first chrominance value of the first pixel in the first segment of pixels;

retrieving from memory the second chrominance value of the first pixel in the first segment of pixels;

retrieving from memory a first value that corresponds to the first chrominance value of a second pixel in the first segment of pixels, wherein the first value either represents a first difference between the first chrominance value of the second pixel and the first chrominance value of another pixel in the first segment that immediately precedes the second pixel or is a first code that is distinct from values representing the first difference;

establishing the first chrominance value of the second pixel from the first chrominance value of the first pixel in the second segment of pixels when the first value is the first code and, when the first value is not the first code, establishing the first chrominance value of the second pixel by combining the first difference with the first chrominance value of the other pixel;

retrieving from memory a second value that corresponds to the second chrominance value of the second pixel in the first segment of pixels, wherein the second value either represents a second difference between the second chrominance value of the second pixel and the second chrominance value of the other pixel in the first segment or is a second code that is distinct from values representing the second difference; and establishing the second chrominance value of the second pixel from the second chrominance value of the first pixel in the second segment of pixels when the second value is the second code and, when the second value is not the second code, establishing the second chrominance value of the second pixel by combining the second difference with the second chrominance value of the other pixel.

16. The medium according to claim 15 that expands the luminance values by padding the luminance values with bits having binary values of zero.

17. The medium according to claim 15 wherein the first code and the second code are identical.

18. The medium according to claim 17 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

19. An apparatus for compressing digital video data representing luminance values, first chrominance values and second chrominance values for a sequence of pixels arranged in a group having a first pixel followed by one or more other pixels, wherein the apparatus comprises memory and processing circuitry coupled to the memory, wherein the processing circuitry performs a process that comprises:

storing in the memory a compressed representation of the luminance values;

storing in the memory a representation of the first chrominance value of the first pixel in the group of pixels;

storing in the memory a representation of the second chrominance value of the first pixel in the group of pixels;

determining a first difference between the first chrominance value of a second pixel in the group and the first chrominance value of another pixel in the group that immediately precedes the second pixel;

storing in the memory a representation of the first difference when the first difference does not exceed a first threshold, and storing in the memory a first code in the memory when the first difference exceeds the first threshold, wherein the first code is represented by a value that is distinct from values stored to represent the first difference;

determining a second difference between the second chrominance value of the second pixel and the second chrominance value of the other pixel that immediately precedes the second pixel; and storing in the memory a representation of the second difference when the second difference does not exceed a second threshold, and storing in the memory a second code in the memory when the second difference exceeds the second threshold, wherein the second code is represented by a value that is distinct from values stored to represent the second difference.

20. The apparatus according to claim 19 that obtains the compressed representation of luminance values by rounding and truncating the luminance values, wherein luminance values equidistant from an even truncated value and an odd truncated value are rounded and truncated to the even truncated value.

21. The apparatus according to claim 19 wherein the first code and the second code are identical.

22. The apparatus according to claim 21 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

23. The apparatus according to claim 19 wherein the representations of the first difference, the second difference, the first code and the second code are three-bit values, and the first and second thresholds are equal to twenty.

24. An apparatus for decompressing digital video data representing luminance values, first chrominance values and second chrominance values for a sequence of pixels arranged in segments of pixels, wherein each segment has a first pixel followed by one or more other pixels, and wherein a first segment of pixels immediately precedes a second segment of pixels in the sequence, wherein the apparatus comprises memory and processing circuitry coupled to the memory, wherein the processing circuitry performs a process that comprises:

retrieving from the memory and expanding the luminance values;

retrieving from the memory the first chrominance value of the first pixel in the first segment of pixels;

retrieving from the memory the second chrominance value of the first pixel in the first segment of pixels;

retrieving from the memory a first value that corresponds to the first chrominance value of a second pixel in the first segment of pixels, wherein the first value either represents a first difference between the first chrominance value of the second pixel and the first chrominance value of another pixel in the first segment that immediately precedes the second pixel or is a first code that is distinct from values representing the first difference;

establishing the first chrominance value of the second pixel from the first chrominance value of the first pixel in the second segment of pixels when the first value is the first code and, when the first value is not the first code, establishing the first chrominance value of the second pixel by combining the first difference with the first chrominance value of the other pixel;

retrieving from the memory a second value that corresponds to the second chrominance value of the second pixel in the first segment of pixels, wherein the second value either represents a second difference between the second chrominance value of the second pixel and the second chrominance value of the other pixel in the first segment or is a second code that is distinct from values representing the second difference; and establishing the second chrominance value of the second pixel from the second chrominance value of the first pixel in the second segment of pixels when the second value is the second code and, when the second value is not the second code, establishing the second chrominance value of the second pixel by combining the second difference with the second chrominance value of the other pixel.

25. The apparatus according to claim 24 that expands the luminance values by padding the luminance values with bits having binary values of zero.

26. The apparatus according to claim 24 wherein the first code and the second code are identical.

27. The apparatus according to claim 26 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

28. An apparatus for compressing digital video data representing luminance values, first chrominance values and second chrominance values for a sequence of pixels arranged in a group having a first pixel followed by one or more other pixels, wherein the apparatus comprises:

means for storing in memory a compressed representation of the luminance values;

means for storing in memory a representation of the first chrominance value of the first pixel in the group of pixels;

means for storing in memory a representation of the second chrominance value of the first pixel in the group of pixels;

means for determining a first difference between the first chrominance value of a second pixel in the group and the first chrominance value of another pixel in the group that immediately precedes the second pixel;

means for storing in memory a representation of the first difference when the first difference does not exceed a first threshold, and for storing in memory a first code when the first difference exceeds the first threshold, wherein the first code is represented by a value that is distinct from values stored to represent the first difference;

means for determining a second difference between the second chrominance value of the second pixel and the second chrominance value of the other pixel that immediately precedes the second pixel; and means for storing in memory a representation of the second difference when the second difference does not exceed a second threshold, and for storing in memory a second code when the second difference exceeds the second threshold, wherein the second code is represented by a value that is distinct from values stored to represent the second difference.

29. The apparatus according to claim 28 that obtains the compressed representation of luminance values by rounding and truncating the luminance values, wherein luminance values equidistant from an even truncated value and an odd truncated value are rounded and truncated to the even truncated value.

30. The apparatus according to claim 28 wherein the first code and the second code are identical.

31. The apparatus according to claim 30 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

32. The apparatus according to claim 28 wherein the representations of the first difference, the second difference, the first code and the second code are three-bit values, and the first and second thresholds are equal to twenty.

33. An apparatus for decompressing digital video data representing luminance values, first chrominance values and second chrominance values for a sequence of pixels arranged in segments of pixels, wherein each segment has a first pixel followed by one or more other pixels, and wherein a first segment of pixels immediately precedes a second segment of pixels in the sequence, wherein the apparatus comprises:

means for retrieving from memory and expanding the luminance values;

means for retrieving from memory the first chrominance value of the first pixel in the first segment of pixels;

means for retrieving from memory the second chrominance value of the first pixel in the first segment of pixels;

means for retrieving from memory a first value that corresponds to the first chrominance value of a second pixel in the first segment of pixels, wherein the first value either represents a first difference between the first chrominance value of the second pixel and the first chrominance value of another pixel in the first segment that immediately precedes the second pixel or is a first code that is distinct from values representing the first difference;

means for establishing the first chrominance value of the second pixel from the first chrominance value of the first pixel in the second segment of pixels when the first value is the first code and, when the first value is not the first code, for establishing the first chrominance value of the second pixel by combining the first difference with the first chrominance value of the other pixel;

means for retrieving from memory a second value that corresponds to the second chrominance value of the second pixel in the first segment of pixels, wherein the second value either represents a second difference between the second chrominance value of the second pixel and the second chrominance value of the other pixel in the first segment or is a second code that is distinct from values representing the second difference; and means for establishing the second chrominance value of the second pixel from the second chrominance value of the first pixel in the second segment of pixels when the second value is the second code and, when the second value is not the second code, for establishing the second chrominance value of the second pixel by combining the second difference with the second chrominance value of the other pixel.

34. The apparatus according to claim 33 that expands the luminance values by padding the luminance values with bits having binary values of zero.

35. The apparatus according to claim 33 wherein the first code and the second code are identical.

36. The apparatus according to claim 35 wherein the representations of the first and second differences and the first and second codes have the same bit length, the representation of the first difference is a binary representation of the first difference, the representation of the second difference is a binary representation of the second difference, and the first and second codes are represented by values representing binary differences that are not used to represent the first and second differences.

\* \* \* \* \*